United States Patent [19]

Banzai et al.

[11] Patent Number: 5,021,623
[45] Date of Patent: Jun. 4, 1991

[54] MACHINING-LIQUID INJECTION NOZZLE UNIT FOR TRAVELING-WIRE EDM APPARATUS

[75] Inventors: Masato Banzai; Yoshio Shibata; Toshio Suzuki, all of Aichi, Japan

[73] Assignee: Mitsubishi Denki K.K., Tokyo, Japan

[21] Appl. No.: 498,059

[22] Filed: Mar. 23, 1990

[30] Foreign Application Priority Data

Mar. 24, 1989 [JP] Japan .................................. 1-72665

[51] Int. Cl.⁵ .............................................. B23H 7/02
[52] U.S. Cl. ................................................ 219/69.12
[58] Field of Search ........................... 219/69.12, 69.14

[56] References Cited

FOREIGN PATENT DOCUMENTS

| | | | |
|---|---|---|---|
| 140134 | 9/1984 | Japan . | |
| 60-80525 | 5/1985 | Japan ................. | 219/69.14 |
| 186135 | 12/1985 | Japan . | |
| 61717 | 3/1986 | Japan . | |
| 152326 | 7/1986 | Japan . | |
| 64-40217 | 2/1989 | Japan ................. | 219/69.14 |

Primary Examiner—Geoffrey S. Evans

Attorney, Agent, or Firm—Sughrue, Mion, Zinn, Macpeak & Seas

[57] ABSTRACT

A machining-liquid injection nozzle unit for use in a traveling-wire EDM apparatus comprises a pair of nozzles disposed opposite to each other through a workpiece and serving to inject a machining liquid individually toward the workpiece while permitting insertion of a wire electrode therethrough in the axial direction thereof coincident with injection of the machining liquid, and a liquid screening member so shaped as to surround the axis of the wire electrode and attached to at least one of the nozzles. The liquid screening member has a low friction coefficient to the workpiece and serves to diminish the lateral force exerted on the fore end of the upper or lower nozzle due to its sliding motion, hence preventing deterioration of the machining precision. The nozzle unit further includes a piston connected to the liquid screening member and capable of producing a predetermined pressure toward the workpiece by the machining liquid in the nozzle. The piston presses the liquid screening member against the workpiece by the constant pressure despite its wear to consequently prevent leakage of the machining liquid while averting reduction of the machining speed.

1 Claim, 5 Drawing Sheets

MACHINING-LIQUID INJECTION NOZZLE UNIT FOR TRAVELING-WIRE EDM APPARATUS

BACKGROUND OF THE INVENTION

1. Field of the Invention

The present invention relates to a traveling-wire EDM (electrical discharge machining) apparatus and, more particularly, to improvements in a nozzle unit used for injecting a machining liquid to a workpiece.

2. Description of the Prior Art

FIG. 6 schematically shows the constitution of an exemplary traveling-wire EDM apparatus known heretofore. In this diagram, there are included a wire electrode 1; a wire bobbin 2 on which the wire electrode 1 is wound; an electromagnetic brake 3a; a brake roller 3 connected to the electromagnetic brake 3a and serving to apply a predetermined tension to the wire electrode 1; idlers 4a, 4b, 4c for changing the traveling direction of the wire electrode 1; a workpiece 5 to be machined; a machining liquid 6; an upper nozzle 7 for injecting and supplying the machining liquid 6 from above to a desired portion of the workpiece 5 being machined; an upper positioning guide 8 disposed in the upper nozzle 7 and serving to support the wire electrode 1; a lower nozzle 9 for injecting and supplying the machining liquid 6 from below to the desired portion of the workpiece 5 being machined; a lower positioning guide 10 disposed in the lower nozzle 9 and serving to support the wire electrode 1; a pump 11 for delivering the machining liquid 6 to both the upper and lower nozzles 7, 9; a machining power source 12 for applying a voltage between the wire electrode 1 and the workpiece 6 to generate electrical discharges; and a takeup roller 13 for winding and taking up the wire electrode 1.

Now an operation performed in the above apparatus will be described below. During an EDM operation, the wire electrode 1 is unwound and forwarded from the wire bobbin 2 and, with directional changes by the idlers 4a, 4b and 4c in the traveling path, a tension is applied by the brake roller 3 connected to the electromagnetic brake 3a, and finally the wire electrode 1 is wound on the takeup roller 13. With regard to the portion of the workpiece 5 to be machined, the wire electrode 1 is guided thereto while being supported by the upper and lower positioning guides 8, 10 in such a manner that the wire electrode 1 and the workpiece 5 are opposed to each other via a narrow gap. Then a voltage from the machining power source 12 is applied between the wire electrode 1 and the workpiece 5. When dielectric breakdown is caused across the narrow gap by such voltage applied, an electrical discharge is generated and the resultant thermal energy derived therefrom melts and removes a partial material of the workpiece 5. In such a state, the wire electrode 1 and the workpiece 5 are relatively displaced while an adequare narrow gap is maintained therebetween by an unshown controller and an unshown driving mechanism, and generation of electrical discharges is repeated for machining the workpiece 5 so that a desired contour is formed by the wire electrode 1. During the EDM operation, it is customary that the machining liquid 6 is delivered via a pump 11 to the upper and lower nozzles 7, 9 and is thereby injected toward the narrow gap for the purpose of ejecting the machining chips or detritus from the narrow gap and recovering the insulation therein while cooling the wire electrode 1 subjected to the high temperature due to the electrical discharges. The gap between the workpiece 5 and each of the upper and lower nozzles 7, 9 is normally set within a range of 0.1 mm to the order of 1 mm and, since the slit width of the contour to be machined is at most 0.5 mm or so, the machining liquid 6 injected toward the narrow gap is not delivered entirely thereto but is divided into a flow 10b supplied to the narrow gap and another flow 10a advanced along the surface of the workpiece 5, as illustrated in FIG. 7.

In the EDM operation, raising the machining speed is important as viewed also from enhancement of the machining efficiency. And such object can be achieved with facility by increasing either the discharge energy or the number of discharges. In such a case, however, the amount of machining chips or detritus is also increased with sharp temperature rise in the wire electrode 1, so that the EDM operation is rendered unstable with another drawback of inducing breakage of the wire electrode 1.

For eliminating such disadvantages, it is necessary to enhance the capabilities of ejecting the chips and cooling the wire electrode 1 by raising the flow speed and the flow rate of the machining liquid 6 injected from the upper and lower nozzles 7, 9. However, regardless of increasing the delivery pressure of the pump 11, the machining liquid 6 is caused to flow mostly along the surface of the workpiece 5 as denoted by 10a, and nearly none of the machining liquid 6 is supplied to the narrow gap where the liquid is essentially required, thereby posing another problem that the desired raise of the machining speed fails to be attained. With regard to solution of such problems, there are known some improved techniques as disclosed in, for example, Japanese Patent Laid-open Nos. 61 (1986)-61717, 61 (1986)152326 and Japanese Utility Model Laid-open No. 59 (1984)140134.

FIG. 8 illustrates the technique disclosed in the Japanese Patent Laid-open No. 61 (1986)-61717 mentioned, wherein sponge-like members 100 for preventing leakage of a machining liquid are so disposed as to surround the peripheries of upper and lower nozzles 7, 9 respectively, and one end of such member 100 is rendered slidable while being kept in contact with a workpiece 5, so that the machining liquid 6 injected from the upper and lower nozzles 7, 9 is supplied to a narrow gap without leakage to the outside. In FIG. 9 illustrating another known technique disclosed in the Japanese Patent Laid-open No. 61 (1986)-152326 mentioned, liquid screening rings 201 are provided slidably in a manner to be urged elastically by springs 200 toward a workpiece 5 and are thereby pressed against the outer surfaces of upper and lower nozzles 7, 9 respectively. Such liquid screening rings 201 are kept in sliding contact with the workpiece 5 and serve to supply, without leakage to the outside, the machining liquid 6 injected from the upper and lower nozzles 7, 9 to the narrow gap. And the further prior technique disclosed in the Japanese Utility Model Laid-open No. 59 (1984)-140134 mentioned is illustrated in FIG. 10, wherein an O-ring 300 is held at the fore end of a lower nozzle 9 in a manner to be kept in sliding contact with a workpiece 5, and such O-ring 300 serves to supply, without leakage to the outside, the machining liquid 6 injected from the lower nozzle 9 to the narrow gap.

As described above, both the flow speed and the flow rate of the machining liquid 6 delivered to the narrow gap can be increased to realize a higher machining speed.

However, there exist some disadvantages in the constitution of the conventional machining-liquid injection nozzle unit employed in the traveling-wire EDM apparatus. In the examples of FIGS. 8 and 10 where the sponge-like liquid leakage preventive member 10 or the O-ring 300 is used, a lateral force is exerted on the fore end of the upper or lower nozzle 7, 9 due to the sliding frictional resistance between the workpiece 5 and the leakage preventive member 100 or the O-ring 300, thereby causing some positional displacement of the upper or lower positioning guide 8, 10 incorporated in the leakage preventive member 100 or the O-ring 300 to consequently bring about deterioration of the machining precision. And further the leakage of the machining liquid 6 is increased in accordance with wear of such leakage preventive member 100 or the O-ring 300 induced by the sliding friction, hence causing reduction of the machining speed. Also in another prior example of FIG. 9 where the liquid screening ring 201 is kept in sliding contact with the workpiece 5 by the resilience of the spring 200, the spring 200 comes to be stretched as a result of increased wear of the liquid screening ring 201, and the pressure of the spring 201 is thereby decreased to consequently bring about leakage of the machining liquid 6, hence lowering the machining speed as in the other prior examples.

SUMMARY OF THE INVENTION

The present invention has been accomplished in view of the problems mentioned. Its principal object resides in providing an improved machining-liquid injection nozzle unit for use in a traveling-wire EDM apparatus wherein no deterioration of the machining precision is induced by any relative sliding motion between a liquid screening member and a workpiece.

Another object of the invention is to provide an improved machining-liquid injection nozzle unit which is kept free from causing leakage of the machining liquid despite increased wear of a liquid screening member.

According to one aspect of the present invention, there is provided a machining-liquid injection nozzle unit comprising: a pair of nozzles disposed opposite to each other through a workpiece and serving to inject a machining liquid individually toward the workpiece while permitting insertion of a wire electrode therethrough in the axial direction thereof coincident with injection of the machining liquid; and a liquid screening member so shaped as to surround the axis of the wire electrode and attached to at least one of the nozzles. The liquid screening member has a low friction coefficient to the workpiece and is so disposed that one end thereof is fitted to one side of the nozzle opposed to the workpiece while the other end thereof is brought into sliding contact with the workpiece. In this structure, the liquid screening member having a lower frictional resistance as compared with the workpiece serves to diminish the lateral force exerted on the fore end of the upper or lower nozzle due to its sliding motion.

According to another aspect of the present invention, there is provided a machining-liquid injection nozzle unit comprising: a pair of nozzles disposed opposite to each other through a workpiece and serving to inject a machining liquid individually toward the workpiece while permitting insertion of a wire electrode therethrough in the axial direction thereof coincident with injection of the machining liquid; a piston connected to at least one of the nozzles and serving to produce a predetermined constant pressure toward the workpiece by the machining liquid in the nozzle; and a liquid screening member so shaped as to surround the axis of the wire electrode and attached to at least one of the nozzles. The liquid screening member has a low friction coefficient to the workpiece and is so disposed that one end thereof is connected to the piston while the other end thereof is brought into sliding contact with the workpiece. In the structure described above, the liquid screening member executes the same action as the aforementioned, and the piston pressed by the machining liquid brings the screening member into contact with the workpiece at the constant pressure.

DESCRIPTION OF THE PREFERRED EMBODIMENTS

Hereinafter exemplary embodiments of the present invention will be described with reference to the accompanying drawings.

Figure 1:
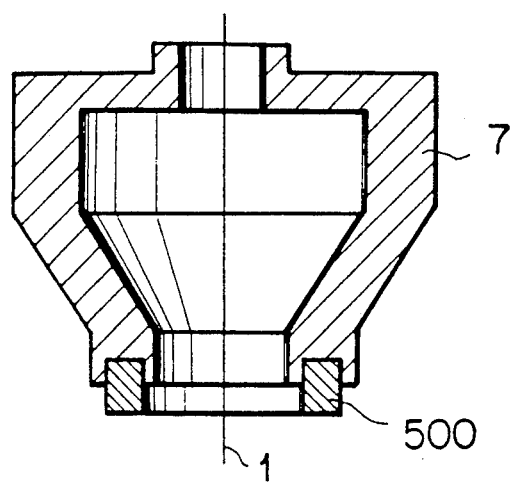
FIG. 1 is a sectional view showing a first embodiment of the machining-liquid injection nozzle unit of the present invention for use in a traveling-wire EDM apparatus.

In FIG. 1, there is included a ring 500 which is shaped to be rectangular in cross section and is disposed in a recess formed at the fore end of an upper nozzle 7. This ring 500 has a low frictional resistance and corresponds to a liquid screening member composed of tetrafluoroethylene or the like. In this diagram, the same components as those used in the aforementioned conventional example of FIGS. 6 through 10 are denoted by the same reference numerals, and a repeated explanation is omitted here.

Figure 2:
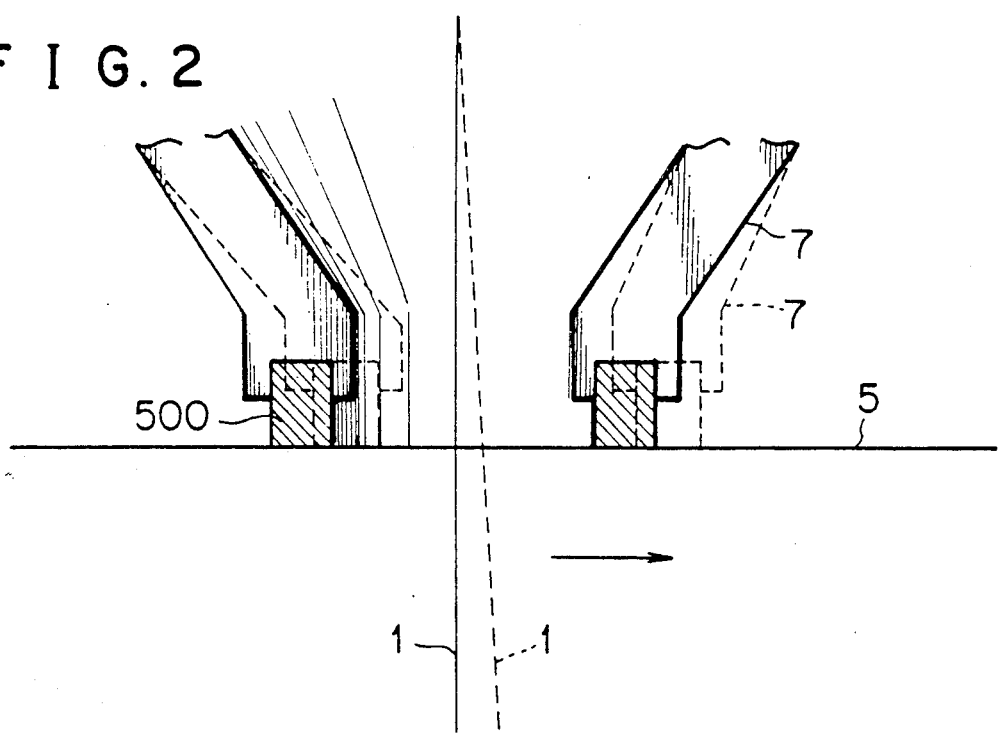
FIG. 2 is a sectional view schematically illustrating the operation of the first embodiment of the nozzle unit in a traveling-wire EDM apparatus.

Now an operation performed in this first embodiment will be described below. The EDM process itself is exactly the same as that in the conventional example, and the lower nozzle 9 executes the same action as that of an upper nozzle 7. Therefore a repeated explanation thereof is omitted, and merely the action of the upper nozzle 7 alone will be mentioned. The ring 500 attached to the fore end of the upper nozzle 7 has an extremely low frictional resistance to a workpiece 5, so that despite a relative displacement between the upper nozzle 7 and the workpiece 5 with a sliding motion, the force exerted in the lateral direction of the upper nozzle 7 j is rendered almost negligible, as shown in FIG. 2, in comparison with any conventional one having a high frictional resistance. Accordingly, there occurs no positional deviation of an upper positioning guide 8 to consequently prevent deterioration of the machining precision.

Figure 3:
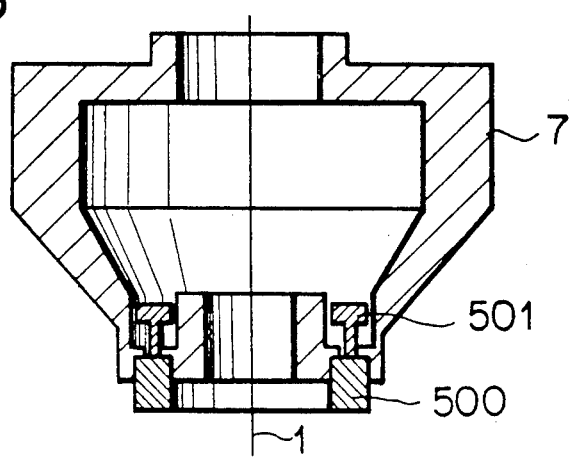
FIG. 3 is a sectional view showing a second embodiment of the machining-liquid injection nozzle unit of the present invention for use in a traveling-wire EDM apparatus.

Hereinafter a second embodiment of the present invention will be described with reference to FIG. 3. In this diagram, a piston 501 is actuated by the pressure of a machining liquid 6 supplied into an upper nozzle 7 and pushes out, at a predetermined constant pressure, a ring 500 connected to the fore end thereof. In FIG. 3, the same components as those used in the aforementioned conventional example of FIGS. 6 through 10 and also in the first embodiment of FIG. 1 according to the present invention are denoted by the same reference numerals, and a repeated explanation is omitted.

An operation of such second embodiment will now be described below. Similarly to the foregoing first embodiment of the invention, the EDM process itself and the action of a lower nozzle 9 are omitted here.

During an EDM operation, the piston 501 attached to the fore end of the upper nozzle 7 is thrusted outward at a predetermined pressure due to the pressure of the machining liquid 6 supplied from a liquid delivery pump 11. As a result of such thrust, the ring 500 is pressed against the workpiece 5 at the predetermined constant pressure. The ring 500 thus pressed against the workpiece 5 has an extremely small frictional resistance to the workpiece so that, as described with respect to the first embodiment of the invention, the force exerted in the lateral direction of the upper nozzle 7 is rendered almost negligible, whereby no positional deviation of the upper positioning guide 8 is induced to consequently prevent deterioration of the machining precision.

Figure 4A:
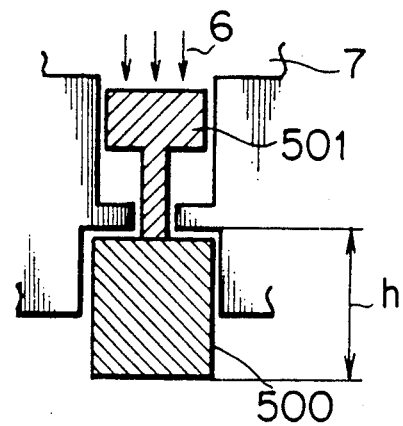
FIGS. 4a and 4b are sectional views schematically illustrating the operation of a piston employed in the second embodiment of the invention.
Figure 4B:
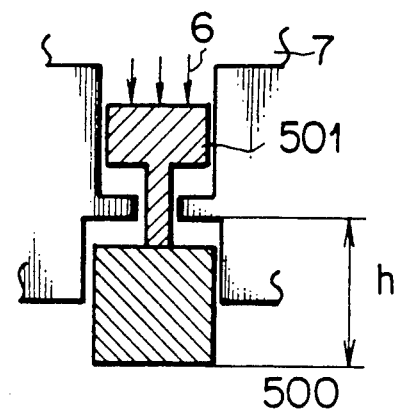
Figure 5:
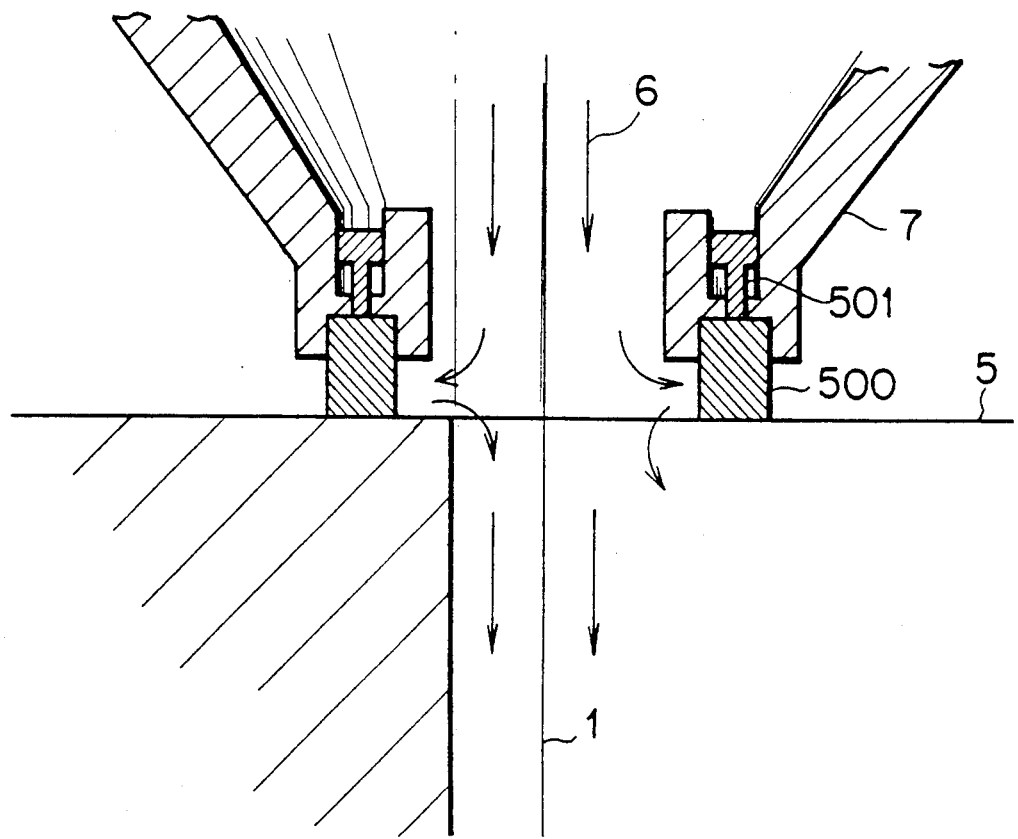
FIG. 5 is a sectional view schematically illustrating the operation of the second embodiment of the nozzle unit in a traveling-wire EDM apparatus.
Figure 6:
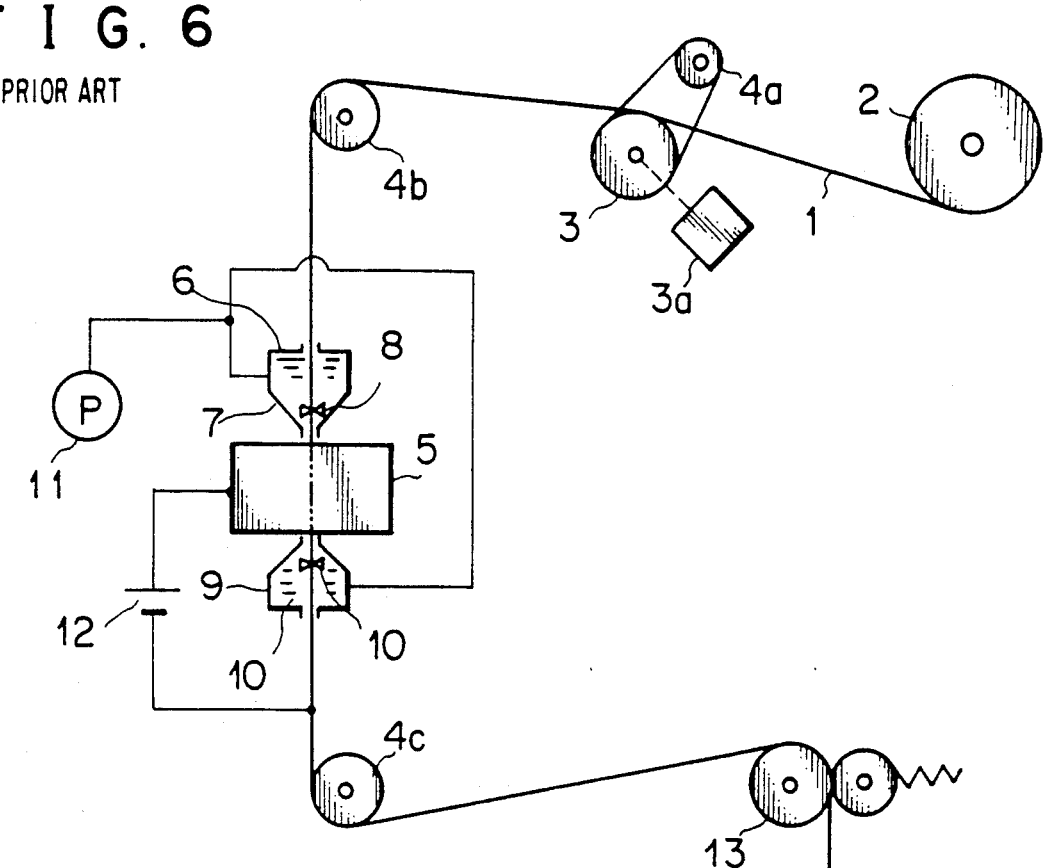
FIG. 6 schematically shows the constitution of a conventional traveling-wire EDM apparatus.
Figure 7:
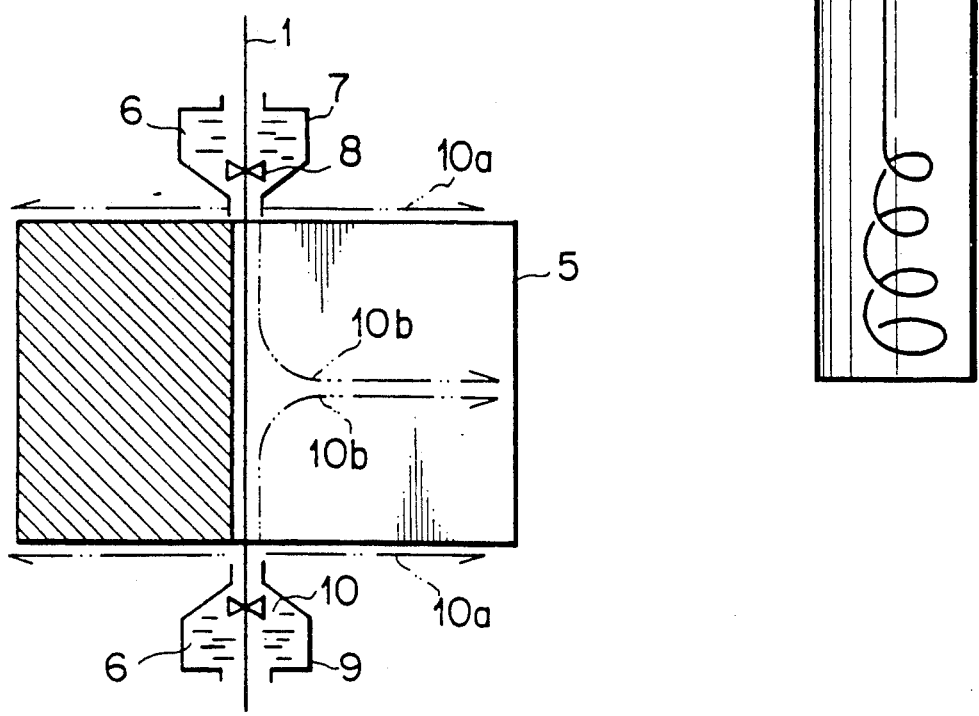
FIG. 7 illustrates the flow of a machining liquid from the injection nozzle unit in the conventional traveling-wire EDM apparatus.
Figure 8:
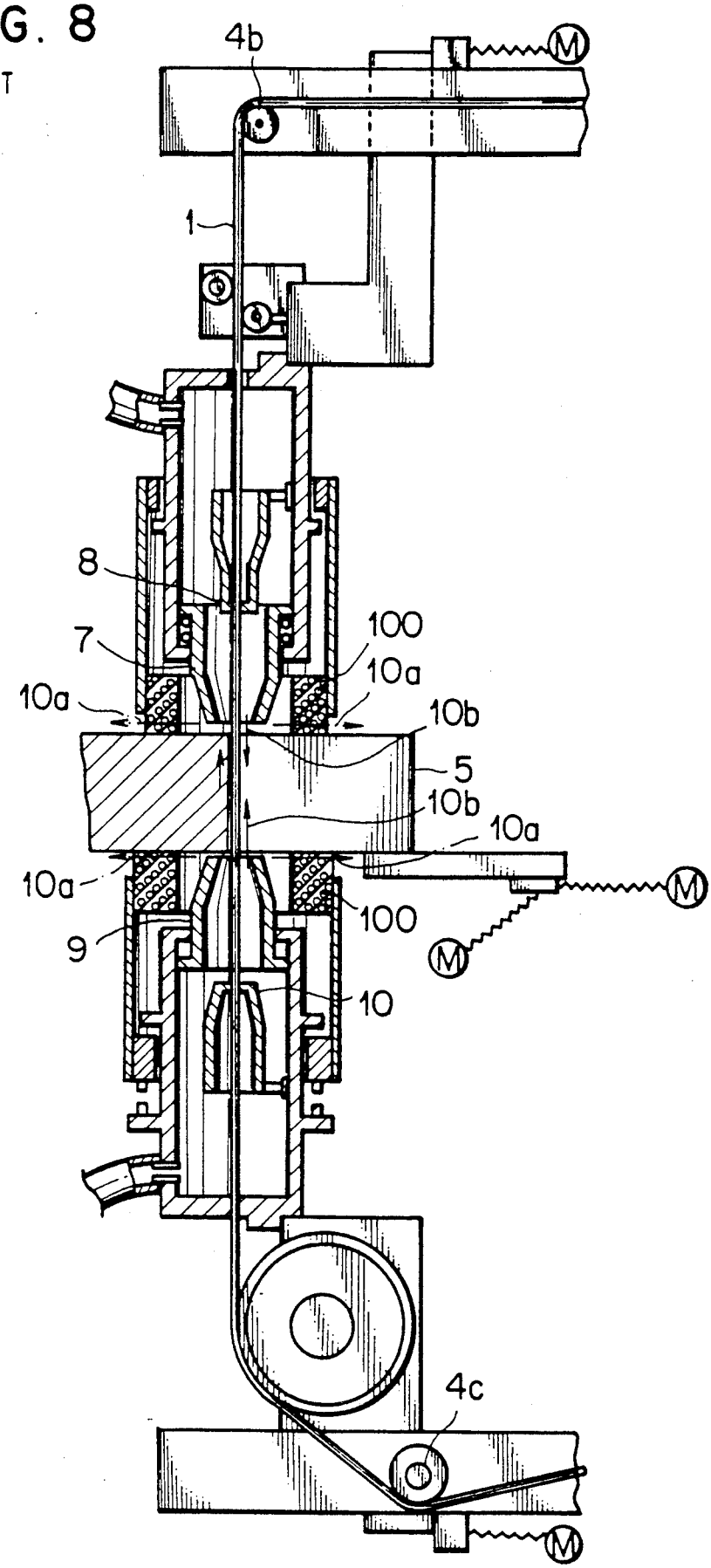
FIGS. 8 through 10 illustrate how the machining liquid is screened by the liquid injection nozzle unit in the conventional traveling-wire EDM apparatus.
Figure 9:
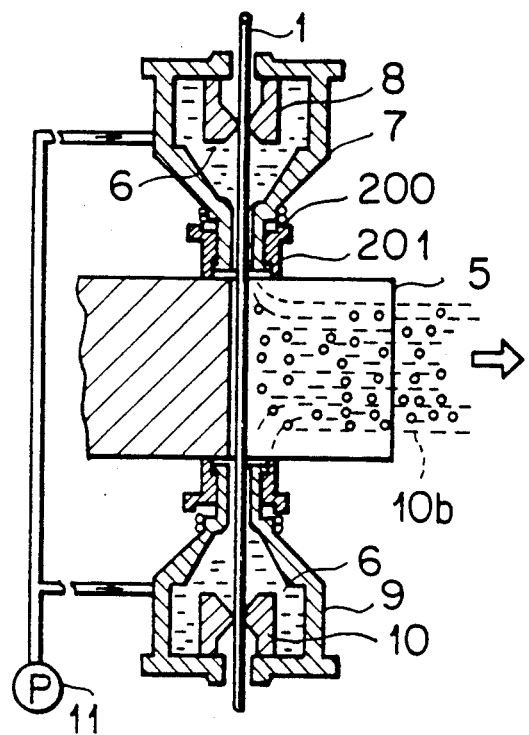
Figure 10:
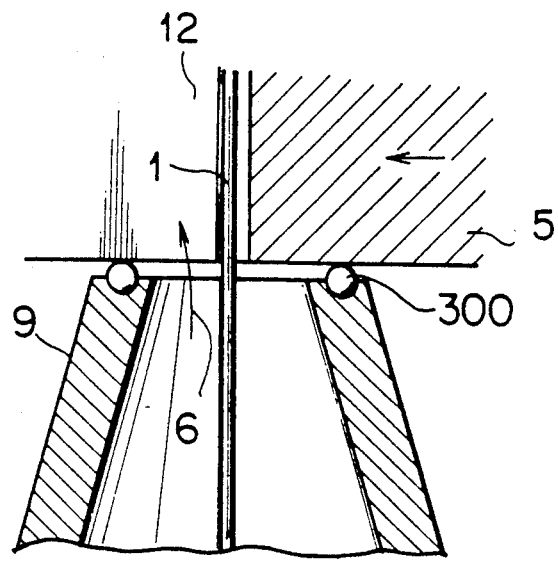

Furthermore, due to the relative sliding motion between the ring 500 and the workpiece 5, the dimension h is kept constant despite any advanced wear of the ring 500 as illustrated in FIG. 4, since the ring 500 is pressed against the workpiece 5 at the predetermined pressure by the piston 501, and therefore the leakage of the machining liquid 6 is not increased without concern to the degree of wear of the ring 500. As a result, the machining liquid 6 can be properly supplied to the cutting slit as illustrated in FIG. 5, hence ensuring satisfactory execution of a fast EDM operation.

In each of the above embodiments, it has been described that the ring 500 is composed of tetrafluoroethylene. However, the material is not limited to such example alone, and any other suitable material may be used to achieve the same effect as in each embodiment on condition that the material has a low friction coefficient, such as Teflon.

Besides the above, the means adopted in the second embodiment for pressing the ring 500 by the piston 501 may be replaced with another means of exerting the thrust of the piston 501 on the upper nozzle 7. In this modification also, the same effect as that in the second embodiment is attainable as well.

As described hereinabove, according to the first embodiment of the present invention, a liquid screening member having a lower friction coefficient as compared with a workpiece and so shaped as to surround a wire electrode is attached to at least one of nozzles disposed opposite to each other through the workpiece, wherein the screening member is positioned on the side opposed to the workpiece. Consequently, there is achieved a remarkable effect in reduction of the sliding resistance between the liquid screening member and the workpiece to eventually avert deterioration of the machining precision.

And according to the second embodiment of the present invention, a piston is connected to a liquid screening member having a lower friction coefficient as compared with a workpiece and so shaped as to surround a wire electrode is attached to at least one of nozzles disposed opposite to each other through the workpiece, in a manner to be positioned on the side opposed to the workpiece, wherein the piston produces a predetermined constant pressure by the machining liquid in the nozzle. As a result, the sliding resistance between the liquid screening member and the workpiece can be diminished to realize an enhanced capability without deterioration of the machining precision. In addition, the liquid screening member is pressed against a workpiece by the constant pressure regardless of its wear to continually prevent leakage of the machining liquid as well as to avert reduction of the machining speed.

What is claimed is:

1. A machining-liquid injection nozzle unit for a traveling-wire EDM apparatus, comprising:
   a pair of nozzles disposed opposite to each other through a workpiece and serving to inject a machining liquid individually toward said workpiece while permitting insertion of a wire electrode therethrough in the axial direction thereof coincident with injection of the machining liquid;
   a piston connected to at least one of said nozzles and serving to produce a predetermined constant pressure toward said workpiece by the machining liquid in said one nozzle; and
   a liquid screening member so shaped as to surround the axis of said wire electrode and attached to at least one of said nozzles, said liquid screening member having a low friction coefficient to said workpiece and being so disposed that one end thereof is connected to said piston while the other end thereof is pressed and brought into sliding contact with said workpiece.

* * * * *